United States Patent
Li et al.

(10) Patent No.: US 11,159,428 B2
(45) Date of Patent: Oct. 26, 2021

(54) COMMUNICATION OF CONGESTION INFORMATION TO END DEVICES

(71) Applicant: Verizon Patent and Licensing Inc., Arlington, VA (US)

(72) Inventors: Feng Li, Lexington, MA (US); Jae Won Chung, Lexington, MA (US); Vivian H. Lu, Arlington, MA (US); Wujun Qie, Needham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 51 days.

(21) Appl. No.: 16/006,157

(22) Filed: Jun. 12, 2018

(65) Prior Publication Data
US 2019/0379604 A1  Dec. 12, 2019

(51) Int. Cl.
*H04L 12/801* (2013.01)

(52) U.S. Cl.
CPC ............. *H04L 47/12* (2013.01); *H04L 47/18* (2013.01)

(58) Field of Classification Search
CPC ......... H04L 47/12; H04L 47/10; H04L 47/11; H04L 43/026; H04L 45/38; H04L 47/127; H04L 47/24; H04L 45/125; H04L 65/80; H04L 43/08; H04L 47/2491
See application file for complete search history.

(56) References Cited

U.S. PATENT DOCUMENTS

| | | | |
|---|---|---|---|
| 2012/0106355 A1* | 5/2012 | Ludwig | H04L 47/20 370/241 |
| 2014/0321283 A1* | 10/2014 | Thyni | H04L 47/14 370/235 |
| 2015/0016247 A1* | 1/2015 | Hayes | H04L 47/127 370/230 |
| 2015/0029887 A1* | 1/2015 | Briscoe | H04L 47/326 370/252 |
| 2015/0103755 A1* | 4/2015 | Cui | H04W 48/20 370/329 |
| 2015/0256580 A1* | 9/2015 | Morton | H04N 21/64322 709/219 |
| 2016/0050580 A1* | 2/2016 | Bosch | H04L 1/0026 370/252 |
| 2016/0219088 A1* | 7/2016 | Ma | H04L 65/4069 |
| 2017/0180261 A1* | 6/2017 | Ma | H04L 5/0055 |
| 2017/0187641 A1* | 6/2017 | Lundqvist | H04L 47/10 |
| 2017/0245178 A1* | 8/2017 | Nobukiyo | H04L 47/34 |
| 2017/0366374 A1* | 12/2017 | Osuga | H04L 47/14 |
| 2018/0198715 A1* | 7/2018 | Shmilovici | H04L 47/127 |
| 2019/0207835 A1* | 7/2019 | Lohiya | H04L 43/04 |

* cited by examiner

*Primary Examiner* — Romani Ohri

(57) ABSTRACT

A method, a device, and a non-transitory storage medium are described in which congestion control service is provided. The congestion control service may include determining whether congestion exists relative to packets and a queue of a network device. The congestion control service may include estimating a communication metric value when congestion exists. A differentiated service field of an Internet Protocol header of each packet is used to carry a portion of the communication metric value. The congestion control service transmits the packets, which include the communication metric value, to an end device. The end device may use the communication metric value to adjust a transmission rate of subsequently transmitted packets.

20 Claims, 9 Drawing Sheets

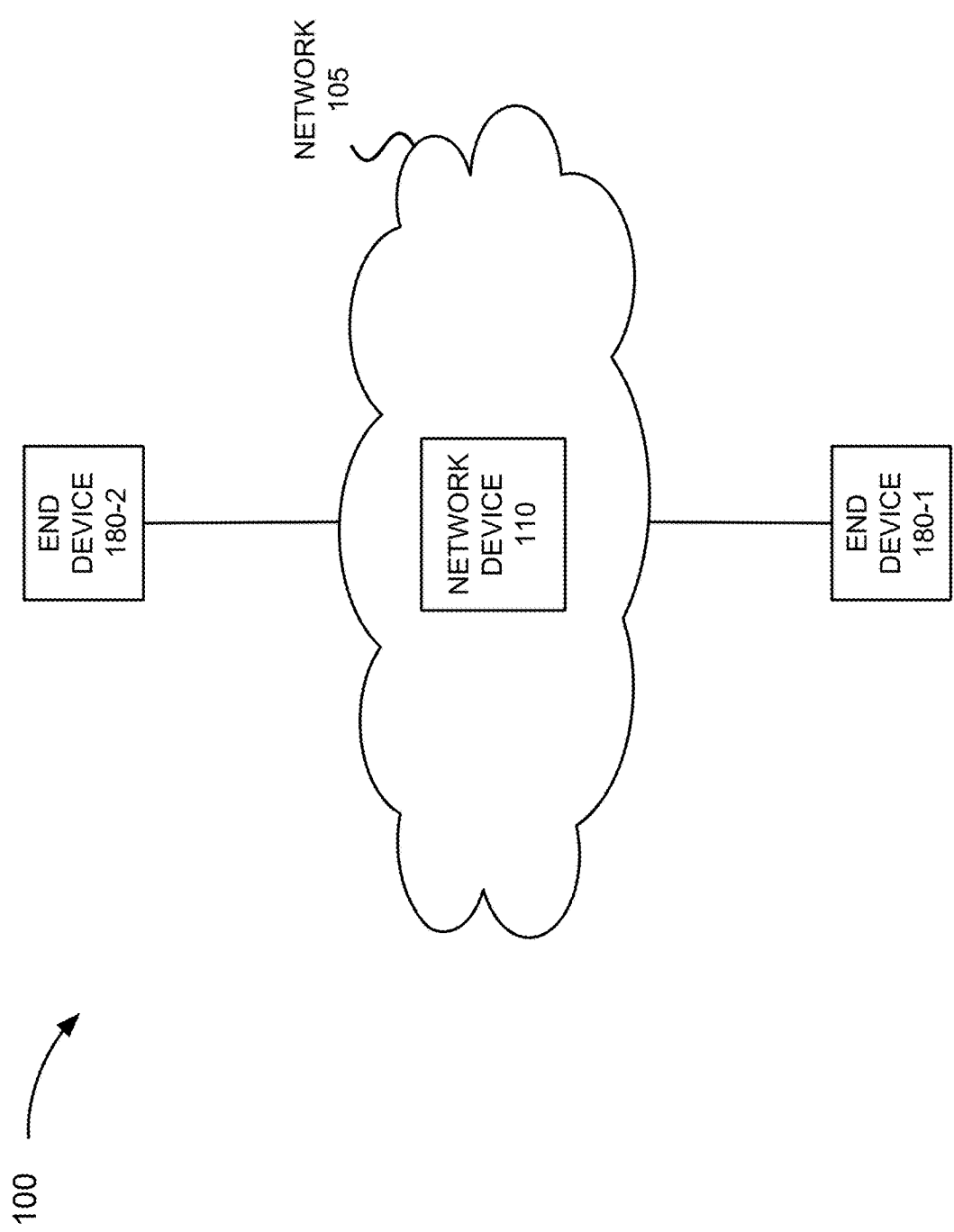

COMMUNICATION OF CONGESTION INFORMATION TO END DEVICES

BACKGROUND

Network service providers use various mechanisms to manage the state and the performance of networks. For example, there are various mechanisms to manage congestion in a network, which can negatively impact successful communication between devices.

BRIEF DESCRIPTION OF THE DRAWINGS

FIG. 1 is a diagram illustrating an exemplary environment in which an exemplary embodiment of a congestion control service may be implemented;

DETAILED DESCRIPTION OF PREFERRED EMBODIMENTS

Figure 2A:
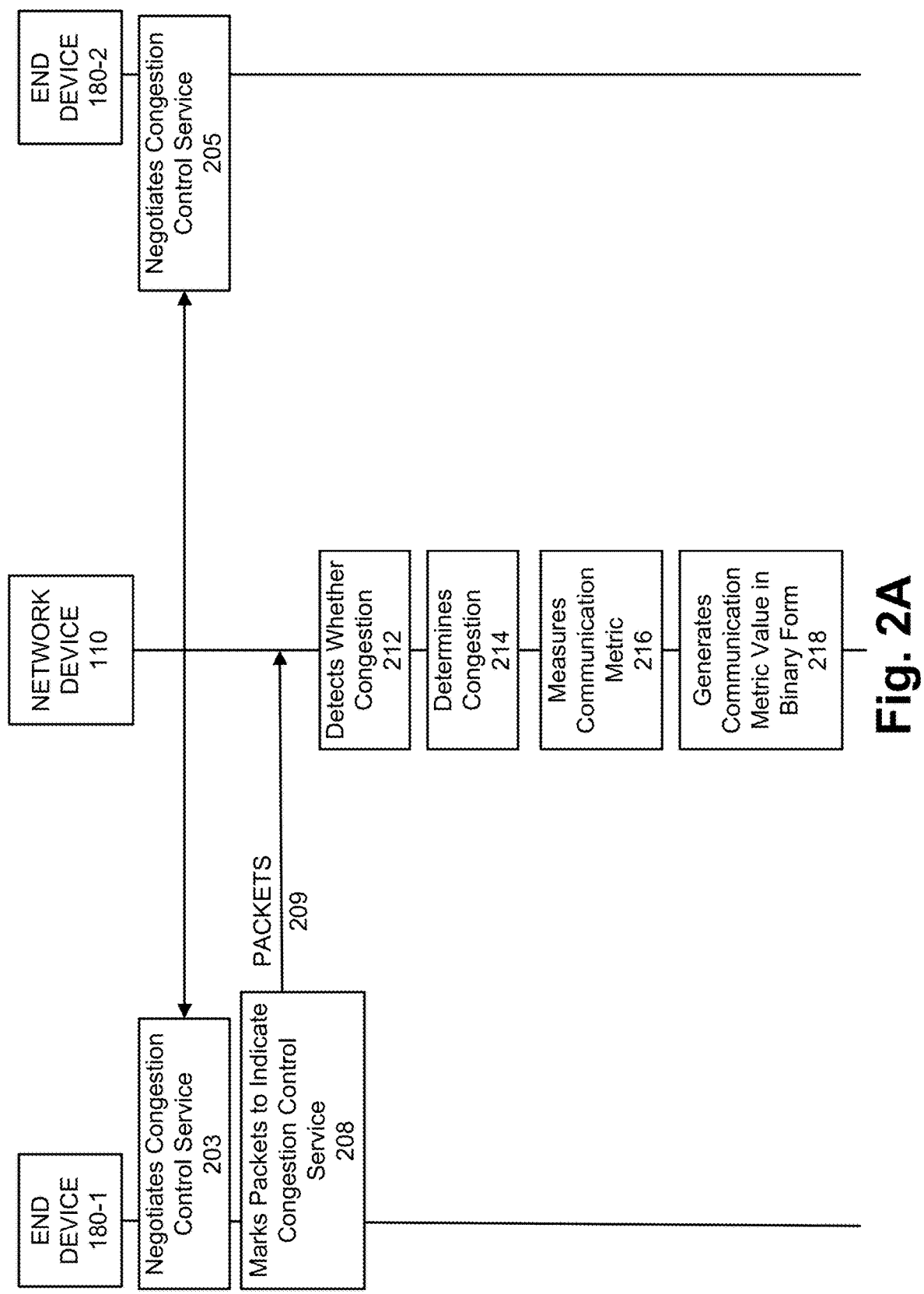
FIGS. 2A-2C are diagrams illustrating exemplary processes of an exemplary embodiment of the congestion control service according to an exemplary scenario.

The following detailed description refers to the accompanying drawings. The same reference numbers in different drawings may identify the same or similar elements. Also, the following detailed description does not limit the invention.

Congestion control is one aspect of network management. Congestion in a network can negatively impact communication between devices. According to one approach, a network device of a Transmission Control Protocol/Internet Protocol (TCP/IP) network may respond to network congestion by dropping packets. Dropped packets may signal the TCP/IP network that congestion is occurring and a packet transmission rate may be reduced. Unfortunately, packets that are dropped will have to be retransmitted. Also, some types of traffic (e.g., bursty traffic, etc.) may cause the TCP/IP network to overly reduce the transmission rate, which results in inefficient bandwidth utilization.

One mechanism used to signal network congestion without dropping packets is Explicit Congestion Notification (ECN). ECN enables end-to-end notification of network congestion between two endpoints (e.g., an ECN-enabled sender and an ECN-enabled receiver) communicating via the TCP/IP network. ECN also requires that each intermediary device along the transmission path between the two endpoints support ECN. Packets may be marked by a sending endpoint, which uses the two least-significant bits in the differentiated services (DiffServ) field of the IP header, to indicate the packets as ECN-capable.

When the ECN-capable packet traverses, for example, an ECN-enabled switch, and experiences congestions at a queue, the ECN-enabled switch may mark the ECN-capable packet as experiencing congestion by setting the DiffSery field to "11" to indicate congestion. The ECN-enabled switch forwards the ECN-enabled packet to the ECN destination point instead of dropping the packet. When the ECN-capable packet reaches an ECN destination endpoint, the ECN destination endpoint determines the presence of congestion based on the DiffSery field, and echoes the congestion indicator to the ECN source endpoint. After receiving the congestion indicator (e.g., indicating congestion), the ECN source endpoint may reduce the transmission rate to relieve the congestion. As a result, ECN may control congestion without causing packets to be dropped and retransmitted.

Unfortunately, the use of the two bits of ECN has notable limitations. For example, the two bits do not communicate a congestion level or a degree of contention for congestion when congestion occurs (e.g., other than congested or not congested). In this regard, an endpoint may be informed that congestion exists, but no information is provided that may be useful in adapting the transmission of packets. Thus, ECN may not be entirely effective in controlling congestion. For example, ECN may contribute to a prolonged state of congestion in the network and/or cause other network performance issues (e.g., congestion collapse, etc.). While extending the number of ECN bits in a packet may support a solution, such an approach would require support from various vendors (e.g., hardware vendors, software vendors) and should require backward compatibility with existing IP headers. In this regard, such an approach may be impractical on various levels.

According to exemplary embodiments, a congestion control service is described. According to an exemplary embodiment, the congestion control service may be implemented in a TCP/IP network. According to other exemplary embodiments a transport protocol different from TCP may be used (e.g., User Datagram Protocol (UDP), Quick UDP Internet Connection (QUIC) protocol, etc.). According to an exemplary embodiment, an intermediary network device of the network identifies whether or not there is congestion for a packet that is marked according to a coding scheme of the congestion control service. According to an exemplary embodiment, the coding scheme of the congestion control service uses a two-bit coding scheme. According to an exemplary embodiment, the coding scheme uses the two least-significant bits in the DiffSery field of the IP header.

In response to identifying the presence of congestion for the packet, the intermediary network device estimates a communication metric value. According to various exemplary implementations, the communication metric value may be an available bandwidth value of a communication link, a drop rate value of a communication link, a utilization value of a communication link, a round trip time (RTT) value, or another type of attribute value pertaining to congestion.

According to an exemplary embodiment, the intermediary network device generates a binary value representative of the communication metric value. According to an exemplary embodiment, the intermediary network device transmits the binary value "one bit per-packet" to a destination endpoint using the coding scheme. In response to receiving the total binary value of the communication metric value, the destination endpoint echoes the binary value to the source endpoint. According to an exemplary implementation, the binary value may be carried in an acknowledgement (ACK). After receiving the total binary value of the communication metric value, the source endpoint may adjust its transmission based on the communication metric value.

As a result, the congestion control service may improve the speed and accuracy for managing congestion by providing the sending/source endpoint, in addition to notice of when congestion exists, a communication metric value that can be used as a basis to adjust its transmission of packets to the destination endpoint. From a network perspective, network access and use may be improved because congestion collapse and access barring may be minimized. From an endpoint perspective, reactive measures that may be taken when congestion occurs (e.g., retransmissions, etc.) may be reduced.

FIG. 1 is a diagram illustrating an exemplary environment 100 in which an exemplary embodiment of the congestion control service may be implemented. As illustrated, environment 100 includes a network 105 that further includes a network device 110. Environment 100 further includes end devices 180-1 and 180-2 (also referred to as end devices 180 and generally or individually as end device 180).

The number and the arrangement of network device 110 in network 105 and the number of end devices 180 are exemplary. For example, there may be multiple network devices 110 in network 105. Environment 100 includes communication links between the end devices 180 and network 105. Environment 100 may be implemented to include wired, optical, and/or wireless communication links. The number and the arrangement of communication links illustrated in environment 100 are exemplary.

Network 105 may include one or multiple networks of one or multiple communication technologies that host network device 110. For example, network 105 may include a wired network, an optical network, and/or a wireless network. Additionally, by way of further example, network 105 may include an access network (e.g., a radio access network (RAN)), a core network, a wide area network (WAN), a metropolitan area network (MAN), a private network, the Internet, a data network, a virtual private network (VPN), and/or another type of network. According to an exemplary embodiment, network 105 is an IP/TCP network. According to other exemplary embodiments, network 105 may be an IP network that uses a Transport Protocol different from TCP (e.g., UDP, QUIC, etc.).

Network device 110 includes logic that provides the congestion control service, as described herein. Network device 110 may be implemented to include a network device that is able to receive and transmit packets (e.g., route or forward packets). Network device 110 may be implemented as a network access or edge device, an intermediary network device, or another type of network device in a communication path between end devices 180. Depending on the embodiment of network 105, network device 110 may be implemented, for example, as a router, a switch, a gateway device, a wireless node (e.g., an evolved Node B, a wireless access point (WAP), etc.), or another type of network device that operates at least in layer 3 of the Open Systems Interconnection (OSI) model (e.g., the network layer). According to an exemplary embodiment, network device 110 includes IP/TCP stack logic that is used to transmit and receive data. According to another exemplary embodiment, network device 110 includes a different IP/Transport Layer stack logic (e.g., IP/UDP, IP/QUIC, etc.) that is used to transmit and receive data.

According to an exemplary embodiment, network device 110 includes logic that identifies a packet that includes data according to a coding scheme of the congestion control service. According to an exemplary embodiment, the coding scheme of the congestion control service uses a two-bit coding scheme. According to an exemplary embodiment, the coding scheme uses the two least-significant bits in the DiffSery field of the IP header. According to other exemplary embodiments, the coding scheme may use additional and/or different fields (e.g., an Options field) of an IP packet. According to still other exemplary embodiments, the coding scheme may use one or multiple bits of one or multiple fields of a Transport Layer packet (e.g., TCP, etc.).

According to an exemplary embodiment, network device 110 includes logic that detects network congestion based on a queue congestion state. According to an exemplary implementation, network device 110 may determine the queue congestion state based on a random early detection (RED) packet drop profile, a weighted random early detection (WRED) packet drop profile, a class-based WRED packet drop profile, a differentiated services code point (DSCP)-based RED packet drop profile, and/or another type of packet drop profile that controls traffic congestion based on packet drop characteristics (e.g., configuration values, etc).

According to an exemplary embodiment, in response to identifying congestion in relation to a marked packet of the congestion control service, network device 110 includes logic that estimates a communication metric value. According to various exemplary implementations, the communication metric value may be an available bandwidth value of a communication link, a drop rate value of a communication link, a utilization value of a communication link, an RTT value, or another type of attribute value indicative of congestion.

According to an exemplary embodiment, network device 110 includes logic that generates a binary value representative of the communication metric value. According to an exemplary embodiment, network device 110 inserts the binary value into packets according to a "one bit per-packet" approach using the two least-significant bits in the DiffSery field of the IP header. According to another exemplary embodiment, network device 110 inserts the binary value into packets according to a "two bits or more" approach. According to still other exemplary embodiments, network device 110 may use additional and/or different fields of different packets (e.g., IP, TCP, etc.) to communicate the communication metric value.

According to an exemplary embodiment, network device 110 includes logic that selects marked packets of a same traffic flow to carry the communication metric value. Instead of dropping the marked packets, network device 110 transmits the communication metric value, according to the "one bit per-packet" approach toward the receiving end device (e.g., end device 180).

According to an exemplary implementation of the "two-bit" coding scheme, "00" may indicate a reset or clear (e.g., no congestion) by an end device (e.g., sender, receiver) when multiple "00"s (e.g., three or more) are received; "01" and "10" may indicate "0" and "1", respectively; and "11" may indicate a congestion flag, and may serve as a beginning flag and an ending flag of a message (e.g., the communication metric value). According to an exemplary implementation, the coding scheme may use a message of a fixed bit length. For example, the fixed length may be eight bits or another bit length.

According to other exemplary implementations, the bit values of the two-bit coding scheme for the congestion control service may indicate additional and/or different types of information. For example, subsequent to an ending flag of a congestion control message, network device 110 may insert in a packet a two-bit value that indicates the type of communication metric from among multiple possible communication metrics to which the communication metric value pertains. Additionally, network device 110 may communicate a series (e.g., two or more) of different communication metric values or the same (e.g., estimated or calculated at different times by network device 110) to a receiving end device 180. According to still other exemplary implementations, the coding scheme may use more than two bits per packet.

End device 180 includes logic that provides the congestion control service, as described herein. End device 180 may be implemented as a mobile device, a portable device, a stationary device, a wireless device, a wired device, an optical device, or some combination thereof. For example, end device 180 may be implemented as an Internet of Things (IoT) device, an end user device (e.g., a smartphone, a wearable device, a tablet, etc.), or another type of end node. According to an exemplary embodiment, end device 180 includes IP/TCP stack logic that is used to transmit and receive data. According to another exemplary embodiment, end device 180 includes a different IP/Transport Layer stack logic (e.g., IP/UDP, IP/QUIC, etc.) that is used to transmit and receive data.

End device 180 includes logic to negotiate the congestion control service with another end device 180. For example, as a part of a TCP three-way handshake between end devices 180, end devices 180 may include data in a SYN and a SYN-ACK that negotiate the use of the congestion control service. By way of further example, ECN-Echo (ECE) and Congestion Window Reduced (CWR) bits of the TCP header may be set. According to other examples, end devices 180 may use different transport protocols, fields, bit values, etc., to negotiate the use of the congestion control service.

Subsequent to negotiating the use of the congestion control service, end device 180 includes logic that marks packets to which the congestion control service applies, which allows network device 110 to identify and mark the packets according to a coding scheme for the congestion control service, as described herein. For example, according to an exemplary implementation of the two-bit coding scheme, end device 180 may set the two bits as "01" or "10" in the DiffServ field of the IP header. According to other exemplary implementations of the coding scheme, the bit value may be set differently.

End device 180 includes logic that echoes the congestion control information to another end device 180. For example, from a receiving end device perspective, in response to receiving packets from network device 110, which carry congestion control information that includes a communication metric value, end device 180 echoes (e.g., re-transmits) the congestion control information to the other end device 180 according to the same coding scheme (used to receive the congestion control information). For example, end device 180 may include the congestion control information in TCP ACKs (e.g., in the DiffServ field of the IP header), and transmit TCP ACKs to a sending end device 180.

End device 180 further includes logic that interprets congestion control information and adjusts its transmission of packets based on the congestion control information. For example, from a sending end device perspective, in response to receiving congestion control information from the receiving end device, end device 180 interprets the congestion control information. For example, end device 180 may determine the communication metric value and the communication metric (e.g., available bandwidth, drop rate, etc.). End device 180 includes logic that adjusts its transmission rate based on the communication metric and the communication metric value. According to an exemplary implementation, end device 180 may store adaptation information that correlates the communication metric/value with a transmission rate. According to another exemplary implementation, end device 180 may use an algorithm that uses the communication metric/value as an argument to calculate a transmission rate.

Figure 2B:
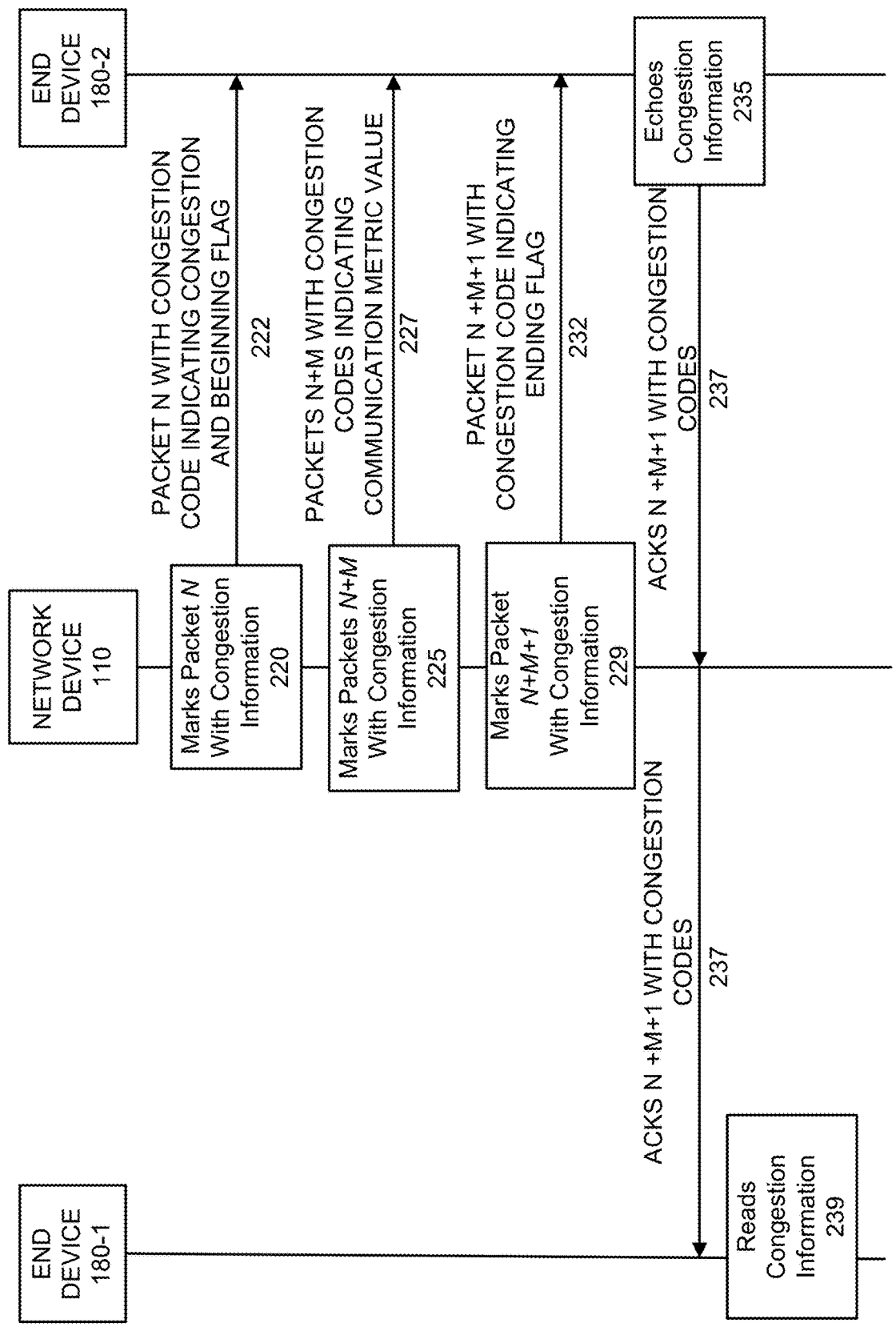
Figure 2C:
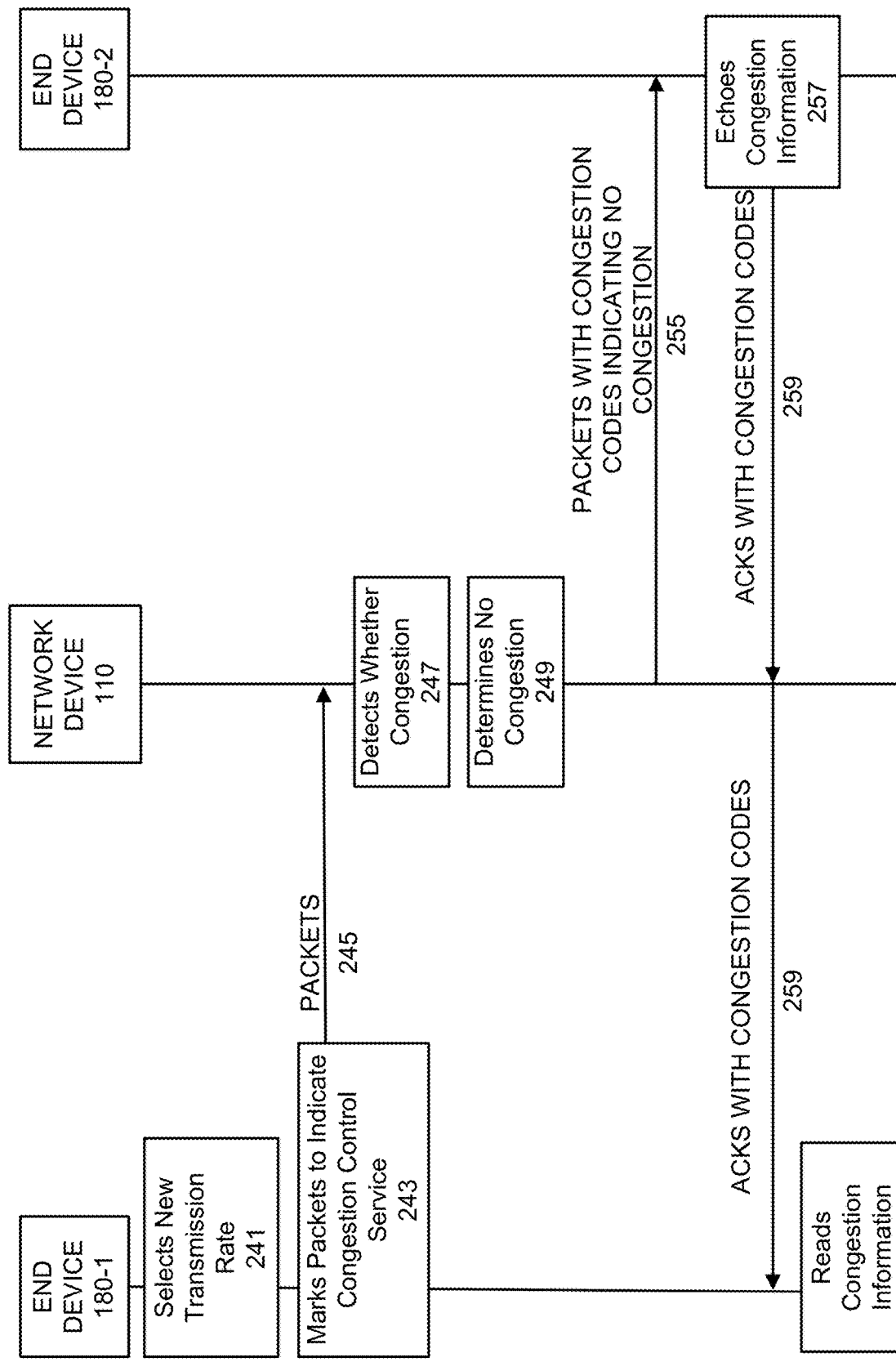

FIGS. 2A-2C are diagrams illustrating an exemplary process of the congestion control service. Referring to FIG. 2A, according to an exemplary scenario, assume that end device 180-1 negotiates for use of the congestion control service 203 and end device 180-2 negotiates for use of the congestion control service 205. For example, end devices 180-1 and 180-2 may perform a three-way handshake procedure to establish a TCP connection that includes messages (e.g., SYN, SYN-ACK, etc.) carrying data to use the congestion control service. As a result, end devices 180-1 and 180-2 successfully negotiate use of the congestion control service for this connection/session.

Thereafter, end device 180-1 (sender) marks packets to indicate the packets are subject to the congestion control service 208, and transmits the packets 209 to end device 180-2 via network device 110. For example, end device 180 may insert a two-bit code in the two least-significant bits in the DiffServ field of the IP header in each packet. According to an exemplary implementation, the two-bit code may be the value "01" or "10". According to other exemplary implementations, the bit value may be different.

Network device 110 receives packets 209 and determines that the congestion control service applies to these packets based on the two-bit code included in the packets. In response, network device 110 detects whether network congestion is present 212 in relation to packets 209. For example, network device 110 may detect network congestion based on a queue congestion state. According to an exemplary implementation, the queue congestion state may pertain to an egress/outbound queue. According to another exemplary implementation, the queue congestion state may pertain to an ingress/inbound queue. Network device 110 may use a packet drop profile (RED, WRED, etc.) as a basis to detect whether network congestion exists in relation to packets 209. According to this exemplary scenario, assume that network device 110 determines that network congestion exists 214 in relation to a packet.

In response, network device 110 may estimate a communication metric value of a communication metric 216. As previously described, the communication metric may be implemented as an available bandwidth, a drop rate, a link utilization, an RTT, or another type of attribute indicative of congestion. Network device 110 may generate a communication metric value in binary form 218 corresponding to the estimated communication metric. For example, according to an exemplary scenario, assume that network device 110 estimates an available bandwidth to be 23 Megabits per second (Mbps) for the communication link between network device 110 and end device 180-2. Network device 110 may generate a binary value (e.g., 00010111) to represent the communication metric value of 23 relating to the estimated available bandwidth of 23 Mbps. Network device 110 may select a consecutive sequence of packets to carry a congestion control message. For example, network device 110 may use the TCP sequence number of a packet to select a group of packets to carry the congestion control message.

Referring to FIG. 2B, network device 110 may mark a packet N of packets 209 with congestion information 220. For example, network device 110 may change the two-bit code set by end device 180-1 to indicate congestion. For example, network device 110 may change the two-bit code value from "01" or "10" to "11". As previously described, according to an exemplary implementation of the coding scheme, the two-bit congestion code value of "11" may indicate congestion and serve as a beginning flag for a message indicating the communication metric value. As illustrated, network device 110 may transmit packet N with a congestion code, which indicates congestion and serves as a beginning flag 222, to end device 180-2.

As further illustrated, network device 110 may mark N+M packets with congestion information 225. For example, network device 110 may mark packet N+1 with a two-bit value of "01", which represents "0"; packet N+2 with a two-bit value of "01", which represents "0"; packet N+3 with a two-bit value of "01", which represents "0"; packet N+4 with a two-bit value of "10", which represents "1"; packet N+5 with a two-bit value of "01", which represents "0"; packet N+6 with a two-bit value of "10", which represents "1"; packet N+7 with a two-bit value of "10", which represents "1"; and packet N+8 with a two-bit value of "10", which represents "1". Thus, as previously described, according to this example, the communication metric value of 23 relating to the estimated available bandwidth of 23 Mbps is indicated in a one bit per-packet approach. That is, the two bits of "10" represents a single bit "1", and the two bits of "01" represents "0". In contrast, the two bits of "11" represents a two-bit value "11" and may indicate congestion and beginning/ending flags, as previously described. Also, the two bits of "00" represents a two-bit value "00" and may indicate a reset or clear, as previously described.

According to other exemplary implementations, the two bits (e.g., "10", "01") may represent their two bit value. However, according to such an exemplary implementation, the two bit values of "00" and "11" may be used and correspondingly interpreted as such when placed between beginning and ending flags. Additionally, the coding scheme may use a mechanism to distinguish the bit value of "11" relating to the communication metric value and an ending flag of the message. For example, one implementation may be based on the fixed length of a message.

Network device 110 may transmit packets N+M (e.g., N+1 through N+8) with these exemplary congestion codes 227 to end device 180-2. Next, network device 110 may mark a packet N+M+1 with congestion information 229. For example, network device 110 may mark packet N+M+1 with a two-bit value of "11", which indicates an ending flag of the congestion control message. Network device 110 may transmit packet N+M+1 with the congestion code 232, which indicates an ending flag for the message, to end device 180-2.

End device 180-2 receives the marked packets transmitted by network device 110. In response, for example, end device 180-2 reads the congestion information carried in the packets, and determines to echo (e.g., transmit/send) the congestion information 235 to end device 180-1 based on the indication of congestion. For example, end device 180-2 transmits TCP ACKs N+M+1, which carry congestion information 237 in a same format as received in the DiffServ field of the IP header, to end device 180-1. According to another exemplary implementation, end device 180-2 may transmit fewer packets than those received which carried the congestion information. End device 180-1 receives the TCP ACKs N+M+1, which carries the beginning flag, the communication metric value, and the ending flag. In response, end device 180-1 reads the congestion information 239.

Referring to FIG. 2C, end device 180-1 selects a new transmission rate 241 based on the congestion information. For example, according to an exemplary implementation, end device 180-1 may calculate a transmission rate based on the communication metric value and an algorithm. According to another exemplary implementation, end device 180-1 may store adaptation information that correlates the communication metric value with a transmission rate. According to such an exemplary implementation, end device 180-1 may perform a look-up and select the transmission rate based on the result of the look-up. An example of the adaptation information is illustrated in FIG. 3 and described further below.

Figure 3:
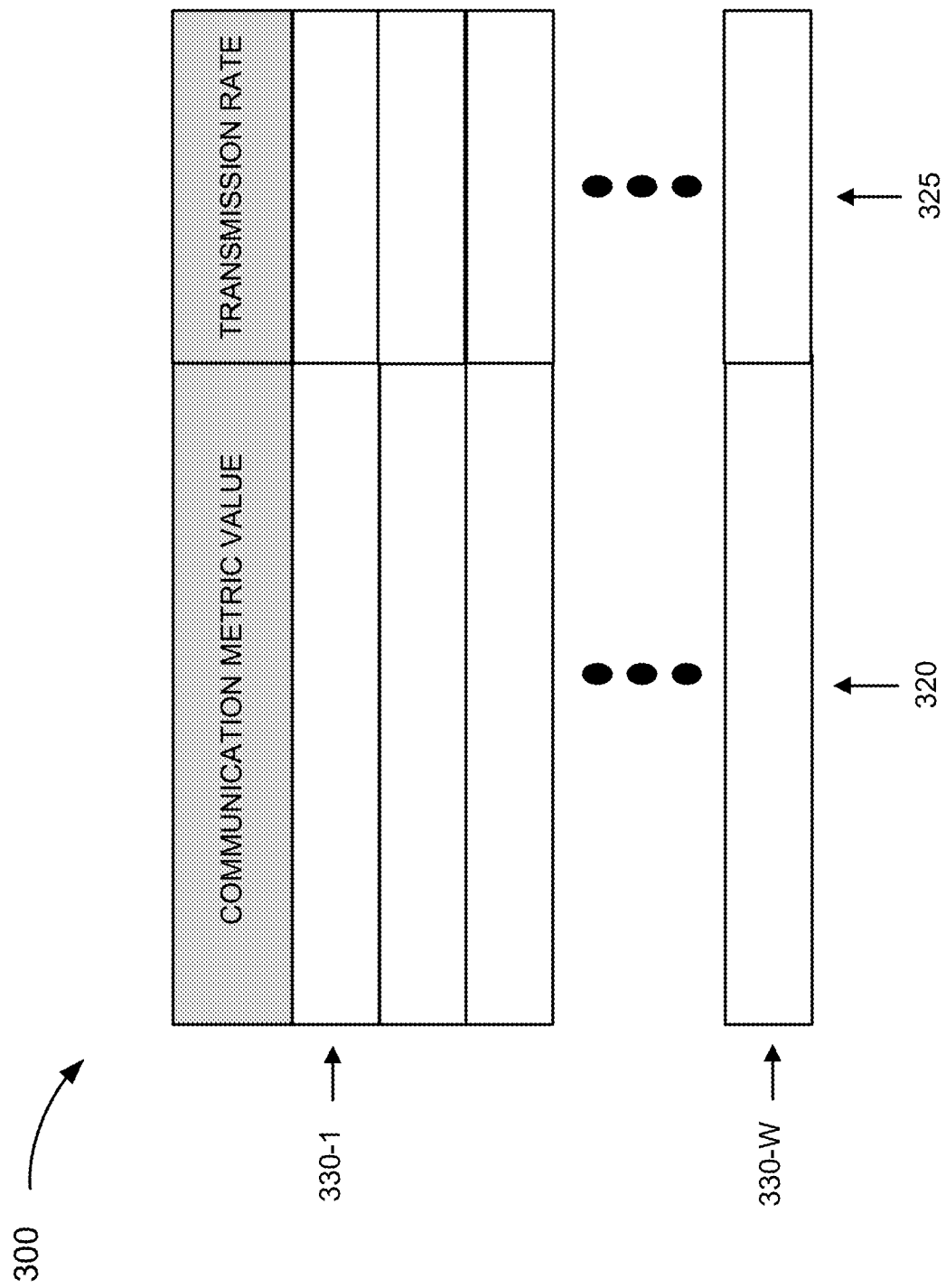
FIG. 3 is a diagram illustrating exemplary adaptation information.

Referring to FIG. 3, exemplary adaptation information may be stored in a table 300 that includes a communication metric value field 320 and a transmission rate field 325. As further illustrated, table 300 includes records 330-1 through 330-W. Adaptation information is illustrated in tabular form merely for the sake of description. Adaptation information may be implemented in a data structure different from a table.

According to other exemplary implementations, table 300 may store additional and/or different instances of adaptation information in support of the congestion control service, as described herein. For example, table 300 may include a communication metric field that indicates the communication metric (e.g., available bandwidth, link drop rate, etc.). Thus, depending on the communication metric/value estimated by network device 110, end device 180 may store multiple types of communication metrics and select the appropriate communication metric to correlate to a transmission rate.

Communication metric value field 320 may store one or multiple communication metric values (e.g., singular, a range of values, multiple values, etc.) pertaining to one or multiple communication metrics. Transmission rate field 325 may store one or multiple transmission rates (e.g., singular, a range of values, multiple values, etc.).

Referring back to FIG. 2C, based on the selection of the new transmission rate, end device 180-1 (sender) marks packets to indicate that the packets are subject to the congestion control service 243, and transmits the packets 245 to end device 180-2 via network device 110. According to an exemplary implementation, end device 180-1 may set a flag in a field of a Transport packet (e.g., the TCP CWR flag in the TCP header, etc.) to indicate to end device 180-2 that a new transmission rate has been selected. According to other exemplary implementations, this step may be omitted.

Network device 110 receives the packets 245 and determines that the congestion control service applies to these packets based on the two-bit congestion code included in the packets. In response, network device 110 detects whether network congestion is present 247. For example, network device 110 may detect network congestion based on a queue congestion state. According to this exemplary scenario, assume that network device 110 determines that network congestion does not exist 249. In response, according to an exemplary implementation, network device 110 may change the congestion codes to indicate no congestion, and may transmit the packets, which indicates no congestion 255, to end device 180-2. For example, according to an exemplary implementation of the coding scheme, network device 110 may change the two-bit congestion code value to "00", which may indicate no congestion (e.g., a reset, clear, etc.) to a configurable number of packets. According to another exemplary implementation, network device 110 may not change the congestion codes to indicate no congestion.

End device 180-2 may receive the packets, which may indicate no congestion, from network device 110. In a manner similar to that previously described, end device 180-2 may echo the congestion information 257 to end device 180-1 via network device 110. For example, end device 180-2 may transmit TCP ACKs or other suitable Transport Protocol messages, which may carry congestion information 259 in a same format as received in the DiffServ field of the IP header, to end device 180-1. According to other exemplary implementations, end device 180 may not echo the congestion information.

End device 180-1 may receive the TCP ACKs or other suitable messages that indicate no congestion. In response, end device 180-1 reads the congestion information 261. End device 180-1 may elect to maintain the transmission rate or adjust it (e.g., increase it, etc.). Alternatively, absent receiving echoed messages that congestion still exists, end device 180-1 may determine that no congestion exists and may maintain the transmission rate or adjust it.

Although FIGS. 2A-2C illustrate an exemplary process of the congestion control service, according to other exemplary embodiments, the process may include additional, different, and/or fewer steps, and/or include additional, different, and/or fewer messages. For example, the codeword scheme described may be implemented using two-bit values that are different in meaning from those described. Additionally, or alternatively, the codeword scheme may include a codeword that indicates the communication metric. For example, subsequent to the ending flag, a two-bit value may map to a communication metric. By way of further example, "00"=available bandwidth, "01"=link drop rate, "10"=link utilization, etc. In this way, two-bit values may have multiple meanings depending on context and/or order within a message.

Figure 4:
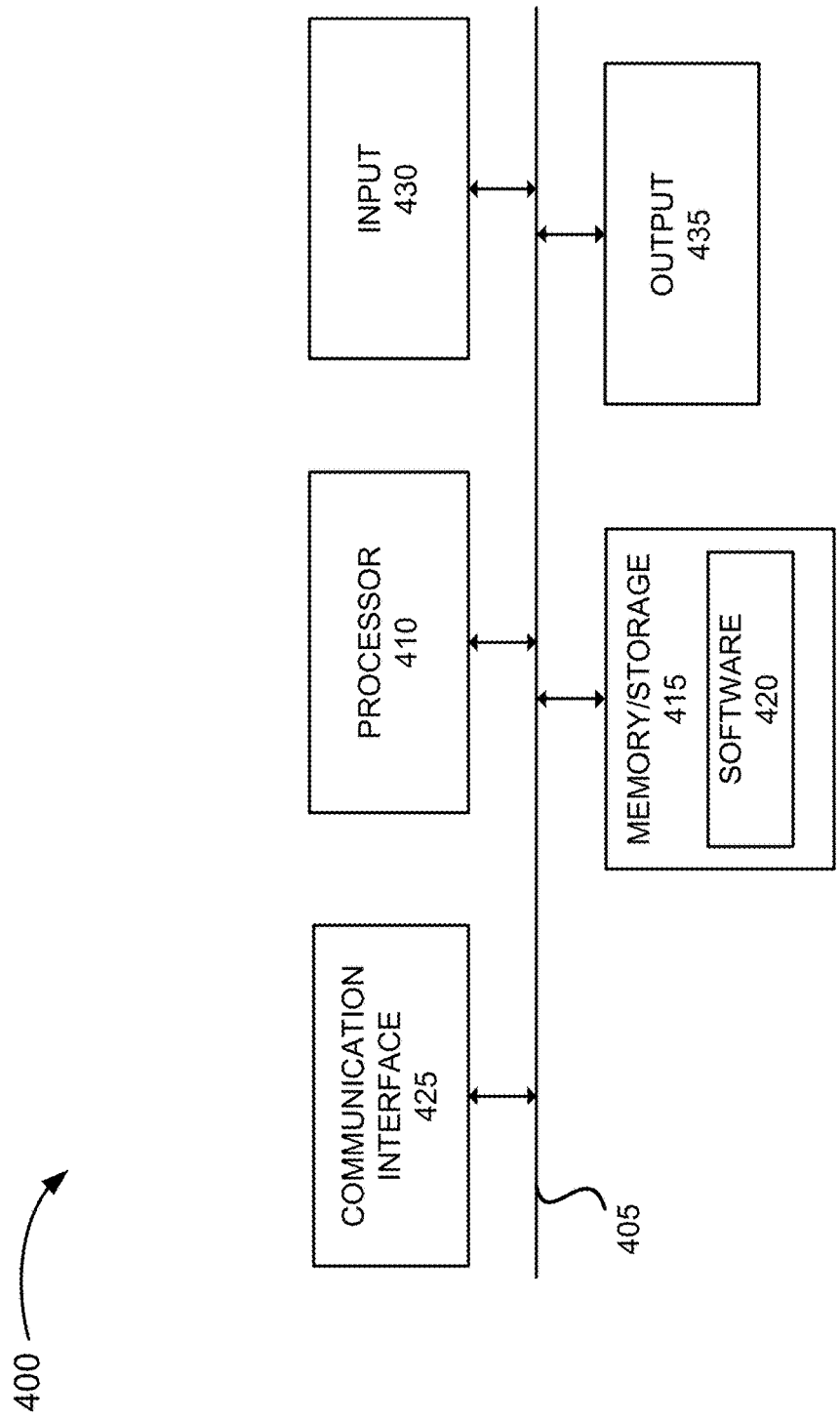
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in network device 110 and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network device 110, software 420 may include an application that, when executed by processor 410, provides the functions of the congestion control service, as described herein. Additionally, with reference to end device 180, software 420 may include an application that, when executed by processor 410, provides the functions of the congestion control service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

A network device may be implemented according to various computing architectures and according to various network architectures (e.g., a virtualized function, a non-virtualized function, etc.). Device 400 may be implemented in the same manner. For example, device 400 may be instantiated, spun up, spun down, etc., using well-known virtualization techniques.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
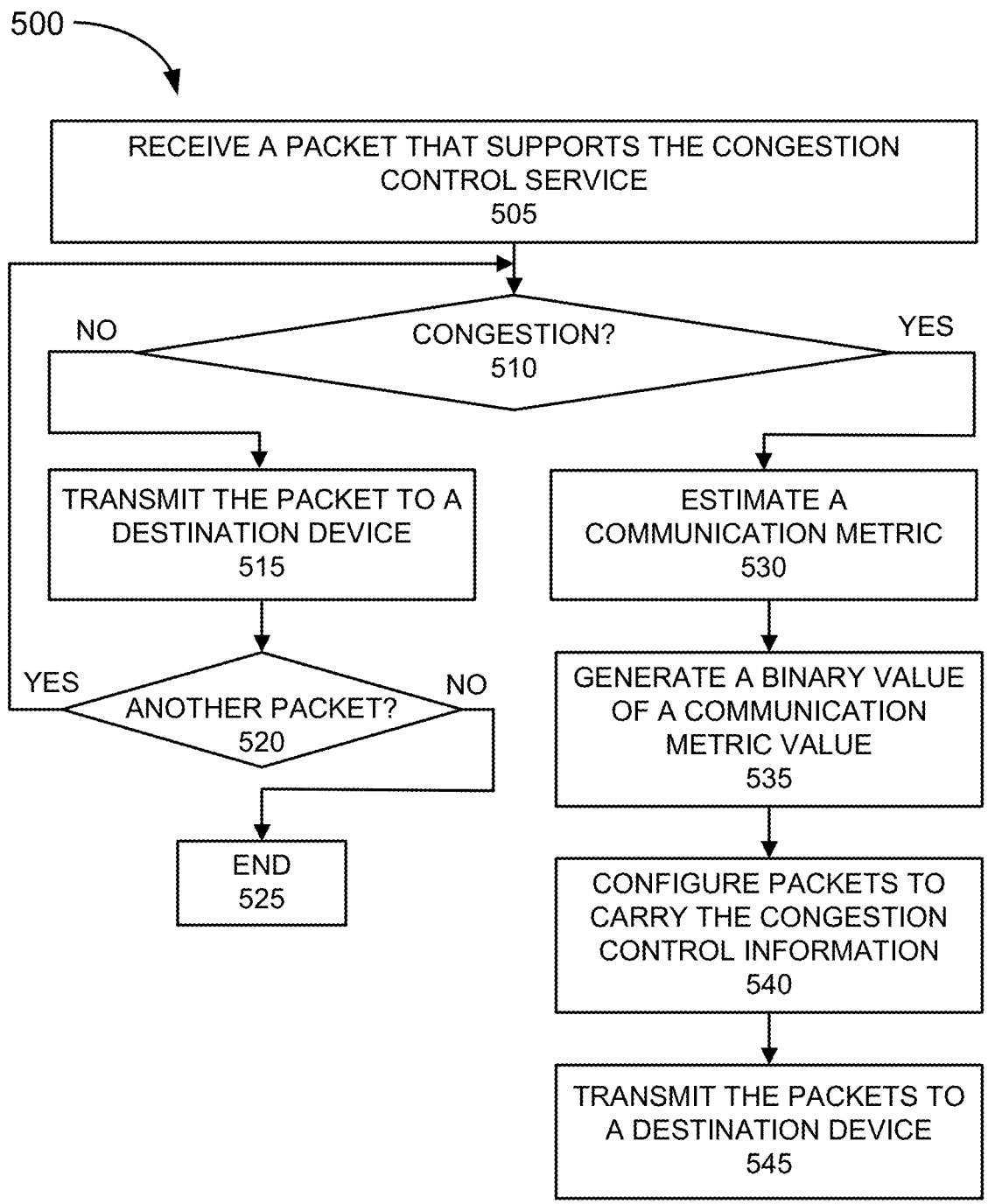
FIG. 5 is a flow diagram illustrating an exemplary process of an exemplary embodiment of the congestion control service.

FIG. 5 is a flow diagram illustrating an exemplary process 500 of an exemplary embodiment of the congestion control service. According to an exemplary embodiment, network device 110 performs steps of process 500. For example, processor 410 executes software 420 to perform the steps illustrated in FIG. 5, and described herein.

Referring to FIG. 5, in block 505, a packet that supports the congestion control service may be received. For example, network device 110 may receive the packet, which includes congestion control information in the DiffSery field of an IP header of the packet, from end device 180-1. The congestion control information may indicate that the packet is subject to the congestion control service.

In block 510, it may be determined whether congestion exists in relation to the packet. For example, network device 110 may determine whether an inbound queue and/or an outbound queue, which stores the packet, is congested such that the packet should be dropped. Network device 110 may use a drop packet configuration (e.g., a RED packet drop profile, etc.) to make such a determination, as previously described.

When it is determined that there is no congestion (block 510—NO), the packet may be transmitted to a destination device (block 515). For example, network device 110 may transmit the packet to end device 180-2. In block 520, network device 110 may determine whether another packet of the same traffic flow is received. When it is determined that another packet is not received (block 520—NO), then process 500 may end. When it is determined that another packet is received (block 520—YES), then process 500 may return to block 510.

When it is determined that there is congestion (block 510—YES), a communication metric may be estimated or calculated (block 530). For example, network device 110 may estimate a communication metric value pertaining to the communication metric, such as available bandwidth, drop rate, etc., as previously described.

In block 535, a binary value of the communication metric value may be generated. For example, network device 110 may generate and store the communication metric value as a binary value.

In block 540, packets may be configured to carry the congestion control information. For example, network device 110 may select the packet (e.g., packet N) to carry the codeword that indicates congestion and a beginning flag of the message, and select subsequently received packets of the same traffic flow to carry the communication metric value and the ending flag message, according to a one bit per-packet approach, as previously described. Network device 110 may select the packets based on a sequence number (e.g., a TCP sequence number, a QUIC packet number, etc.) pertaining to each packet. For example, network device 110 may order a consecutive sequence of packets, based on their respective sequence number, that are sufficient in number to carry the congestion control information.

Similarly, for UDP-based transport layer protocol (e.g., QUIC, etc.), network device 110 may order a consecutive sequence of UDP packets to carry the congestion control information. For the traffic over UDP, there may or may not exist "reverse traffic" from end device 180-2 to end device 180-1 (e.g., duplex communication, etc.). If there is no reverse traffic from end device 180-2 to end device 180-1, the congestion control information added by network device 110 would be discarded by end device 180-2 because there is no way to transmit any congestion control information back to end device 180-1.

In block 545, the packets may be transmitted to a destination device. For example, network device 110 may transmit the packets, which carry the congestion control information, to end device 180-2.

Although FIG. 5 illustrates an exemplary process 500 of the congestion control service, according to other embodiments, process 500 may include additional operations, fewer operations, and/or different operations than those illustrated in FIG. 5, and described herein.

Figure 6:
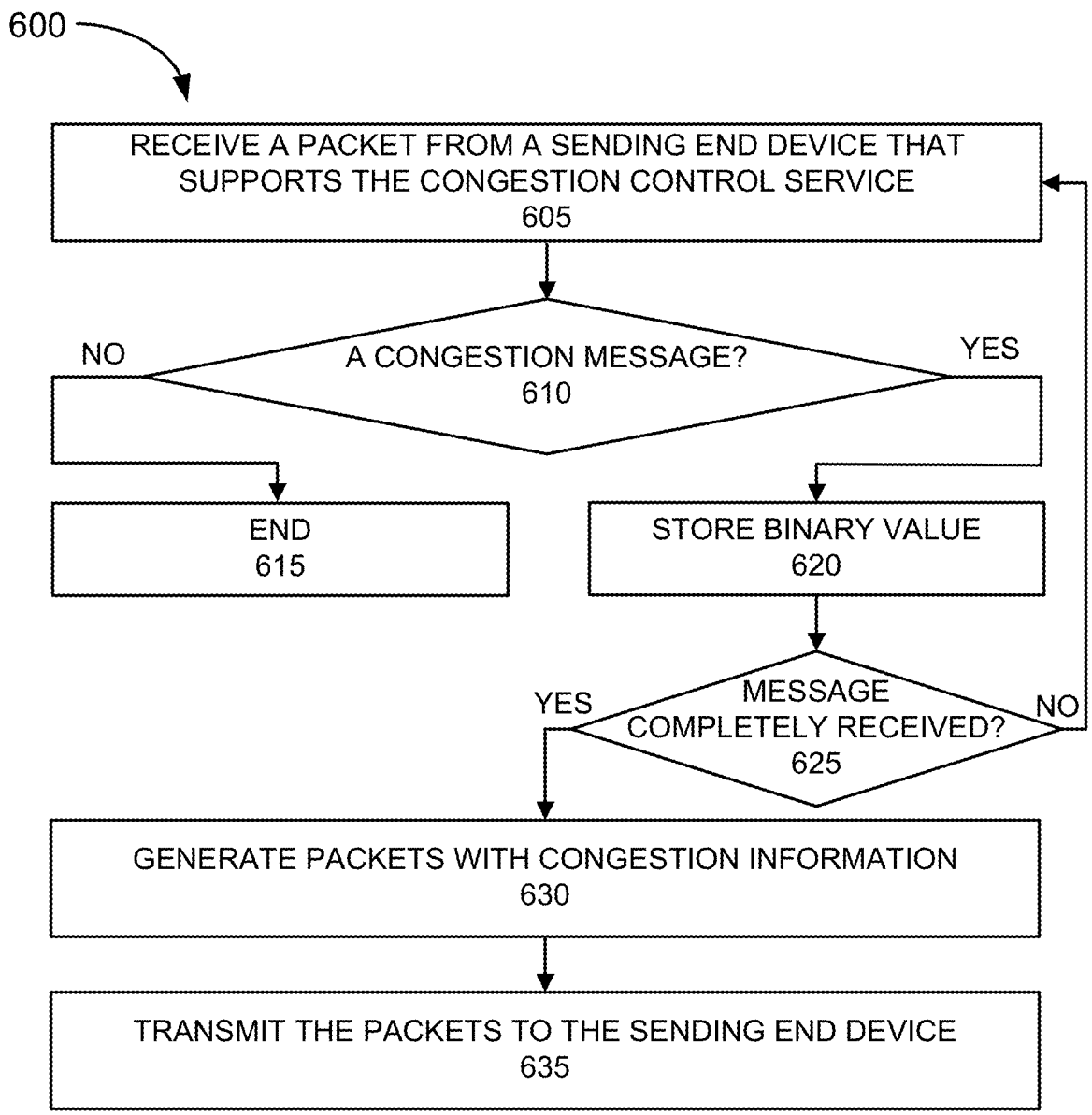
FIG. 6 is a flow diagram illustrating another exemplary process of an exemplary embodiment of the congestion control service.

FIG. 6 is a flow diagram illustrating another exemplary process 600 of an exemplary embodiment of the congestion control service. According to an exemplary embodiment, end device 180 performs steps of process 600. For example, a receiving/destination end device 180-2 may perform process 600. According to an exemplary embodiment, processor 410 executes software 420 to perform the steps illustrated in FIG. 6, and described herein.

Referring to FIG. 6, in block 605, a packet from a sending end device that supports the congestion control service may be received. For example, end device 180-2 (e.g., receiving end device) may receive a packet of a traffic flow that supports the congestion control service.

In block 610, it may be determined whether a congestion message is received. For example, end device 180-2 may determine whether the bits carried in the DiffSery field of an IP packet indicate congestion (e.g., "11").

When it is determined that the packet does not carry a congestion message (block 610—NO), process 600 may end (block 615) or alternatively (not illustrated in FIG. 6) wait for a subsequently arriving packet. When it is determined that the packet does carry a congestion message (block 610—YES), the binary value may be stored (block 620). For example, end device 180-2 may store the bits that indicate congestion. In block 625, it may be determined whether the congestion message has been completely received. For example, end device 180-2 may determine whether a complete message has been received based on the format of the congestion message in view of the coding scheme. Additionally, or alternatively, for example, end device 180-2 may use other types of information (e.g., the length of the congestion message according to the coding scheme of the congestion control service, sequence number of each packet, etc.) to determine whether the congestion message has been completely received.

When it is determined that the message has not been completely received (block 625—NO), process 600 may return to block 605, and may continue to receive packets of the congestion message. End device 180-2 may arrange incoming packets, which carry portions of the congestion message, based on a sequence number for each packet. End device 180-2 may continue to store the binary value associated with each packet.

When it is determined that the message has been completely received (block 625—YES), packets may be generated that carry the congestion control information (block 630). For example, as previously described, end device 180-2 may generate TCP ACKs or other suitable messages that carry the congestion control information according to the coding scheme in which the packets were received. The congestion control information may be carried in the DiffServ field of the IP header.

In block 635, the packets may be transmitted to the sending end device. For example, end device 180-2 may transmit the TCP ACKs or other suitable message, which includes the IP packet, to end device 180-1 via network device 110.

Although FIG. 6 illustrates an exemplary process 600 of the congestion control service, according to other embodiments, process 600 may include additional operations, fewer operations, and/or different operations than those illustrated in FIG. 6, and described herein.

Figure 7:
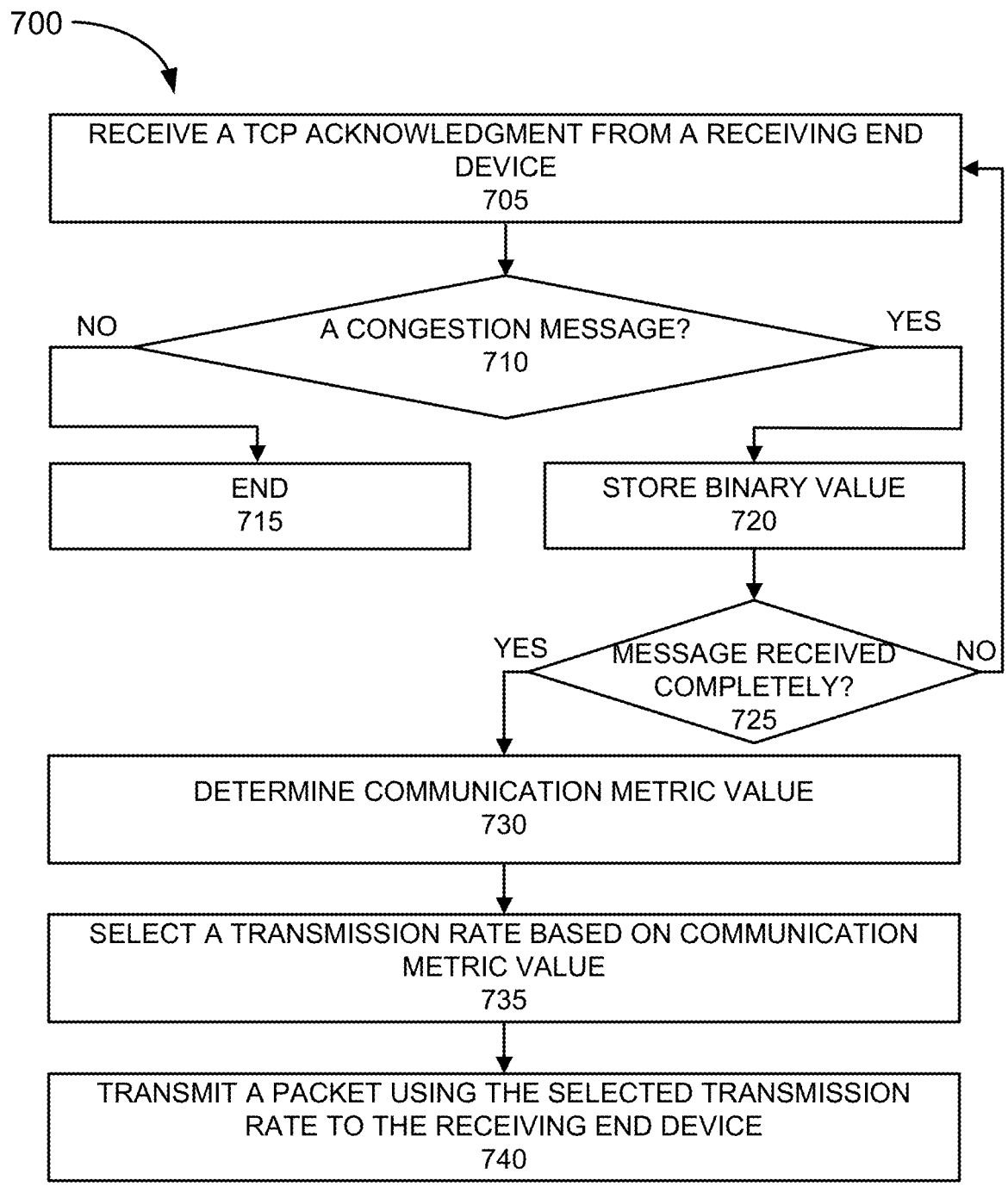
FIG. 7 is a flow diagram illustrating yet another exemplary process of an exemplary embodiment of the congestion control service.

FIG. 7 is a flow diagram illustrating another exemplary process 700 of an exemplary embodiment of the congestion control service. According to an exemplary embodiment, end device 180 performs steps of process 700. For example, a sending/source end device 180-1 may perform process 700. According to an exemplary embodiment, processor 410 executes software 420 to perform the steps illustrated in FIG. 7, and described herein.

Referring to FIG. 7, in block 705, a packet from a receiving end device that supports the congestion control service may be received. For example, end device 180-1 (e.g., sending end device) may receive a TCP ACK or other suitable message, which supports the congestion control service, from end device 180-2 (e.g., receiving end device).

In block 710, it may be determined whether a congestion message is received. For example, end device 180-1 may determine whether the bits carried in the DiffServ field of an IP packet indicate congestion (e.g., "11").

When it is determined that the packet does not carry a congestion message (block 710—NO), process 700 may end (block 715) or alternatively (not illustrated in FIG. 7) wait for a subsequently arriving packet. When it is determined that the packet does carry a congestion message (block 710—YES), the binary value may be stored (block 720). For example, end device 180-1 may store the bits that indicate congestion. In block 725, it may be determined whether the congestion message has been completely received. For example, end device 180-1 may determine whether a complete message has been received based on the format of the congestion message in view of the coding scheme. Additionally, or alternatively, for example, end device 180-1 may use other types of information (e.g., the length of the congestion message according to the coding scheme of the congestion control service, sequence number of each packet, etc.) to determine whether the congestion message has been completely received.

When it is determined that the message has not been completely received (block 725—NO), process 700 may return to block 705, and may continue to receive packets of the congestion message. End device 180-1 may arrange incoming packets, which carry portions of the congestion message, based on a sequence number for each packet. End device 180-1 may continue to store the binary value associated with each packet.

When it is determined that the message has been completely received (block 725—YES), a communication metric value may be determined (block 730). For example, end device 180-1 may identify the communication metric and value from the message.

In block 735, a transmission rate may be selected based on the communication metric value. For example, end device 180-1 may select the transmission rate based on the adaptation information. Alternatively, for example, end device 180-1 may select the transmission rate based on an algorithm that uses the communication metric value as an argument, and the transmission rate is a function of the communication metric.

In block 740, a packet may be transmitted to the receiving end device using the selected transmission rate. For example, end device 180-1 may transmit the packet to end device 180-2 using the selected transmission rate.

Although FIG. 7 illustrates an exemplary process 700 of the congestion control service, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

The term "packet," as used herein, is intended to be broadly interpreted as a packaging for data transmission or communication, the packaging of which may correspond to, for example, a packet, a segment, a message, a cell, a frame, a datagram, or another type of container, unit of data, and/or a fragment thereof.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In addition, while series of blocks have been described with regard to the processes illustrated in FIGS. 5-7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device from a first end device, first packets that include data indicating that the first packets are subject to a congestion control service;
   determining, by the network device, whether congestion exists relative to at least one of the first packets;
   estimating, by the network device in response to determining that the congestion exists relative to the at least one of the first packets, a communication metric value;
   generating, by the network device in response to the estimating, a binary value corresponding to the communication metric value;
   selecting, by the network device in response to the generating, second packets to carry a congestion message that includes the binary value;
   inserting, by the network device, a portion of the binary value in a differentiated service field of an Internet Protocol header included in each of the second packets, wherein an aggregation of the portions of the binary value constitutes the binary value and the congestion message; and
   transmitting, by the network device in response to the inserting, the second packets to a second end device.

2. The method of claim 1, wherein the communication metric value is one of an available bandwidth value, a drop rate value, or a round trip time value.

3. The method of claim 1, wherein the congestion message includes a beginning flag value that immediately precedes the binary value, and an ending flag value that is immediately subsequent to the binary value, and wherein the beginning flag value indicates the congestion.

4. The method of claim 1, wherein the congestion message indicates a communication metric from among multiple communication metrics to which the communication metric value pertains.

5. The method of claim 1, wherein the portion of the binary value in each of the second packets occupies the two least-significant bits in the differentiated service field of the Internet Protocol header and another field.

6. The method of claim 1, wherein the selecting further comprises:
   ordering, by the network device, the second packets according to their sequence numbers and a bit length of the congestion message that is in accordance with a coding scheme of the congestion control service.

7. The method of claim 6, wherein the second packets include at least one of the first packets, and wherein the congestion is a queue state congestion of an outbound queue of the network device.

8. The method of claim 1, wherein the network device is a router, a switch, a gateway device, or a wireless node of an Internet Protocol network, and wherein at least one of the portions of the binary value included in at least one of the second packets is different in value from one or more other portions of the binary value included in one or more other of the second packets.

9. A network device comprising:
   a radio communication interface;
   a memory, wherein the memory stores instructions; and
   a processor, wherein the processor executes the instructions to:
   receive, via the radio communication interface from a first end device, first packets that include data indicating that the first packets are subject to a congestion control service;
   determine whether congestion exists relative to at least one of the first packets;

estimate, in response to a determination that the congestion exists relative to the at least one of the first packets, a communication metric value;

generate, in response to the estimation, a binary value corresponding to the communication metric value;

select, in response to the generation, second packets to carry a congestion message that includes the binary value;

insert a portion of the binary value in a differentiated service field of an Internet Protocol header included in each of the second packets, wherein an aggregation of the portions of the binary value constitutes the binary value and the congestion message; and transmit, via the communication interface in response to the insertion, the second packets to a second end device.

10. The network device of claim 9, wherein the communication metric value is one of an available bandwidth value, a drop rate value, or a round trip time value.

11. The network device of claim 9, wherein the congestion message includes a beginning flag value that immediately precedes the binary value, and an ending flag value that is immediately subsequent to the binary value, and wherein the beginning flag value indicates the congestion.

12. The network device of claim 9, wherein the congestion message indicates a communication metric from among multiple communication metrics to which the communication metric value pertains.

13. The network device of claim 9, wherein the portion of the binary value in each of the second packets occupies the two least-significant bits in the differentiated service field of the Internet Protocol header and another field.

14. The network device of claim 9, wherein the network device is a router, a switch, a gateway device, or a wireless node of an Internet Protocol network, and wherein at least one portion of the binary value is different from one or more other portions of the binary value.

15. The network device of claim 9, wherein the instruction to select, further comprise instructions to:
order the second packets according to their sequence numbers and a bit length of the congestion message that is in accordance with a coding scheme of the congestion control service.

16. A non-transitory, computer-readable storage medium storing instructions executable by a processor of a device, which when executed cause the device to:

receive, from a first end device, first packets that include data indicating that the first packets are subject to a congestion control service;

determine whether congestion exists relative to at least one of the first packets;

estimate, in response to a determination that the congestion exists relative to the at least one of the first packets, a communication metric value;

generate, in response to the estimation, a binary value corresponding to the communication metric value;

select, in response to the generation, second packets to carry a congestion message that includes the binary value;

insert a portion of the binary value in a differentiated service field of an Internet Protocol header included in each of the second packets, wherein an aggregation of the portions of the binary value constitutes the binary value and the congestion message; and transmit, in response to the insertion, the second packets to a second end device.

17. The non-transitory, computer-readable storage medium of claim 16, wherein the communication metric value is one of an available bandwidth value, a drop rate value, or a round trip time value.

18. The non-transitory, computer-readable storage medium of claim 16, wherein the congestion message includes a beginning flag value that immediately precedes the binary value, and an ending flag value that is immediately subsequent to the binary value, and wherein the beginning flag value indicates the congestion.

19. The non-transitory, computer-readable storage medium of claim 16, wherein the congestion message indicates a communication metric from among multiple communication metrics to which the congestion metric value pertains.

20. The non-transitory, computer-readable storage medium of claim 16, wherein the portion of the binary value in each of the second packets occupies the two least-significant bits in the differentiated service field of the Internet Protocol header and another field.

* * * * *